United States Patent [19]
Will et al.

[11] Patent Number: 5,186,261
[45] Date of Patent: Feb. 16, 1993

[54] ON-LAND PLOW ASSEMBLY WITH A PLURALITY OF ADJUSTABLE PLOW UNITS

[75] Inventors: John H. Will, Elkhart; William L. Grimm, Wheaton, both of Ill.

[73] Assignee: Case Corporation, Racine, Wis.

[21] Appl. No.: 720,651

[22] Filed: Jun. 25, 1991

[51] Int. Cl.$^5$ .............................................. A01B 69/00
[52] U.S. Cl. .................................... 172/285; 172/291; 172/314
[58] Field of Search ............... 172/278, 282, 285, 284, 172/283, 286, 291, 314, 695, 677

[56] References Cited

U.S. PATENT DOCUMENTS

| | | | |
|---|---|---|---|
| 3,503,453 | 3/1970 | Johannsen et al. | 172/285 X |
| 3,583,494 | 6/1971 | Thompson et al. | 172/285 |
| 3,603,405 | 9/1971 | Arnold et al. | 172/285 X |
| 3,750,759 | 8/1973 | Geurts | 172/285 |
| 3,817,333 | 6/1974 | Kinzenbaw | 172/283 |
| 3,918,528 | 11/1975 | Kinzenbaw | 172/285 X |
| 4,077,651 | 3/1978 | Steinbach et al. | 172/285 X |
| 4,186,806 | 2/1980 | Ward | 172/283 |
| 4,475,601 | 10/1984 | Harden et al. | 172/283 |
| 4,502,544 | 3/1985 | Stangeland | 172/283 |

Primary Examiner—Randolph A. Reese
Assistant Examiner—Jeffrey L. Thompson
Attorney, Agent, or Firm—Dressler, Goldsmith, Shore, Sutker & Milnamow, Ltd.

[57] ABSTRACT

A plow assembly adapted for connection to a tractor and including a plurality of plow units commonly connected to a beam which is inclined relative to the direction of travel of the plow assembly. A ground engaging steering wheel supporting a rear end of the beam. A steering system is provided for holding the steering wheel generally parallel to rear wheels on the tractor and for turning the steering wheel through an angle and opposite to a steering angle of the tractor to bring the plow assembly behind the tractor during turns. The steering system includes a linkage mechanism for proportionately reducing the turning angle of the steering wheel relative to the steering angle of the tractor thereby allowing tractor turns to exceed 35° to either side of the direction of travel of the plow assembly. The plow assembly further includes a mechanism for quickly and easily changing the spacing between adjacent plow units as the plow assembly is pulled through the field and with minimal operator involvement.

15 Claims, 8 Drawing Sheets

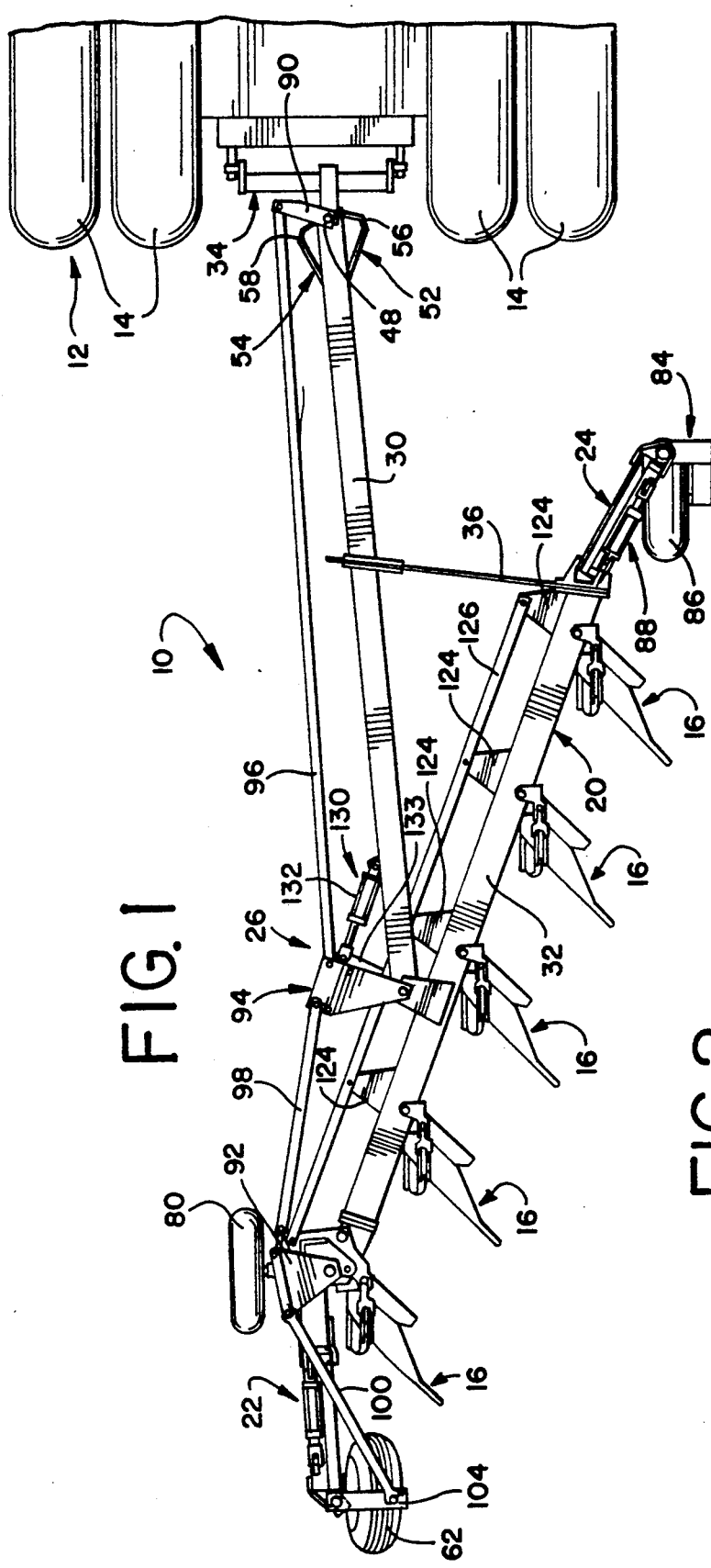
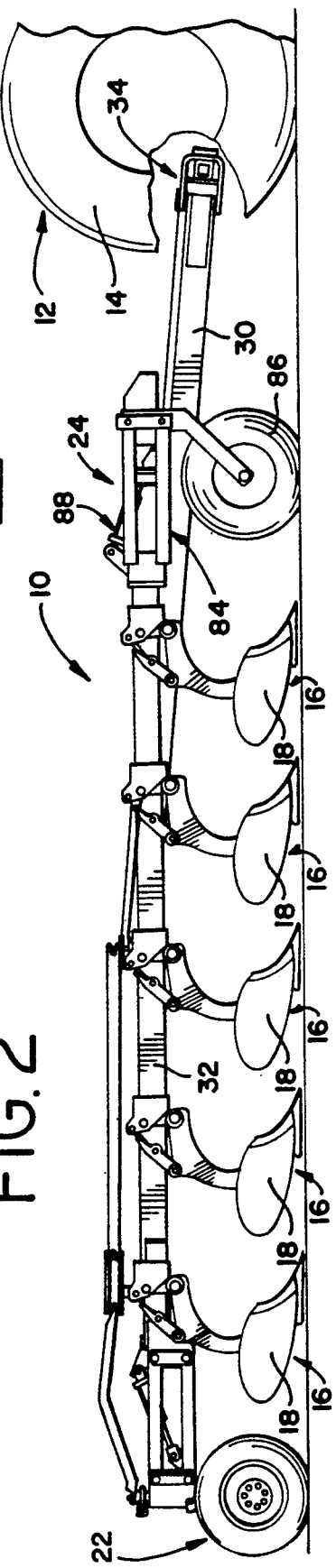

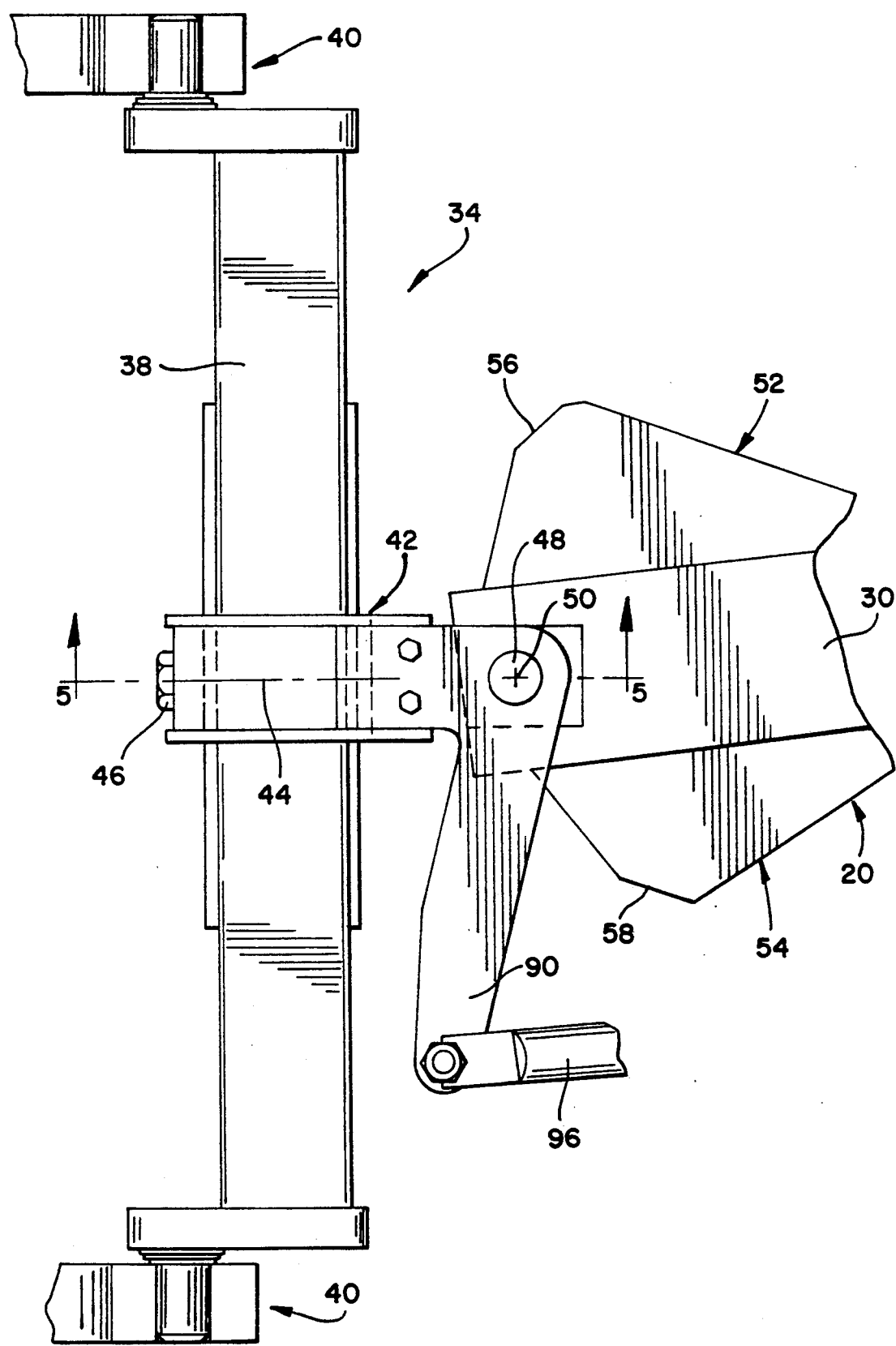

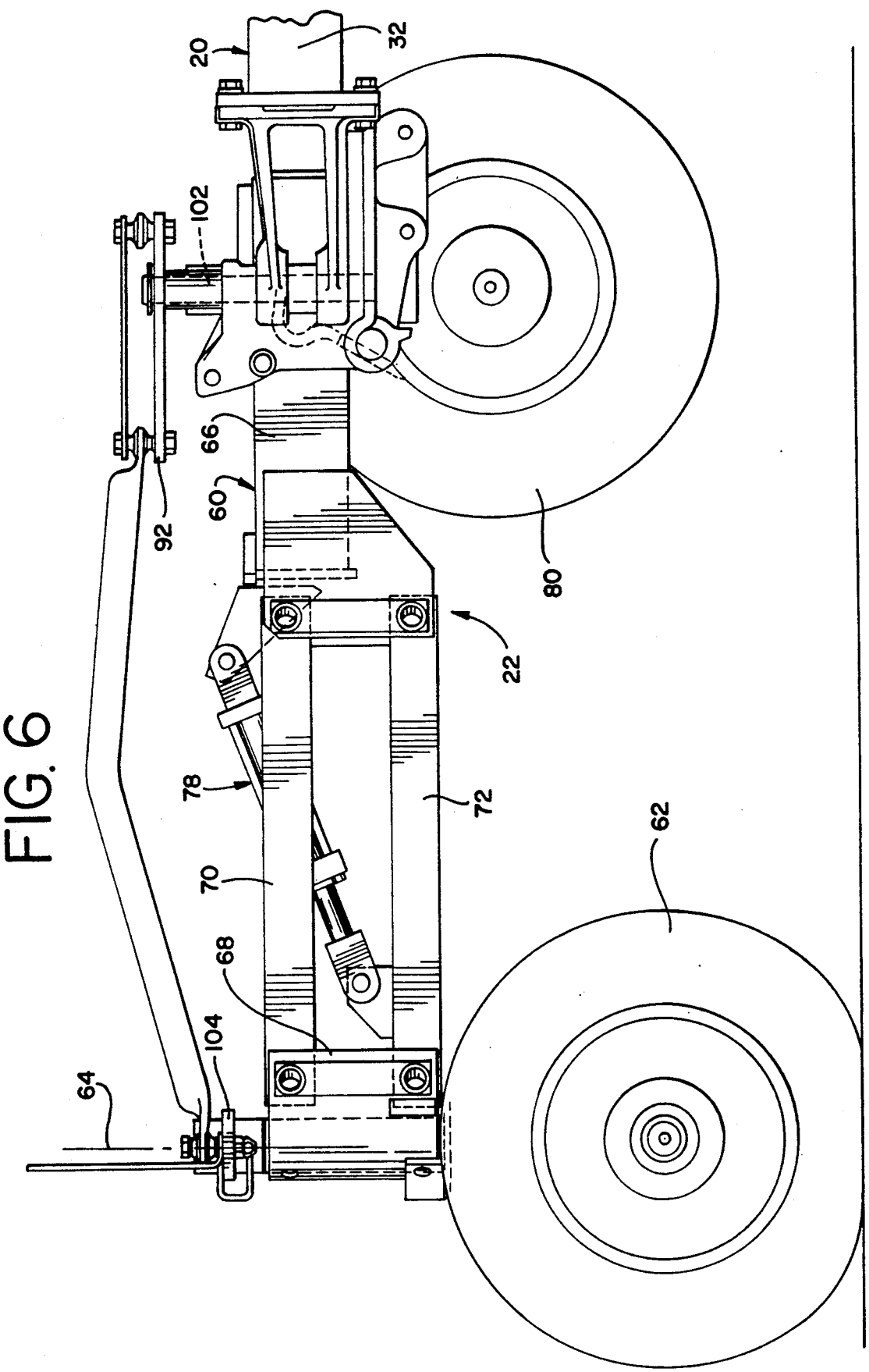

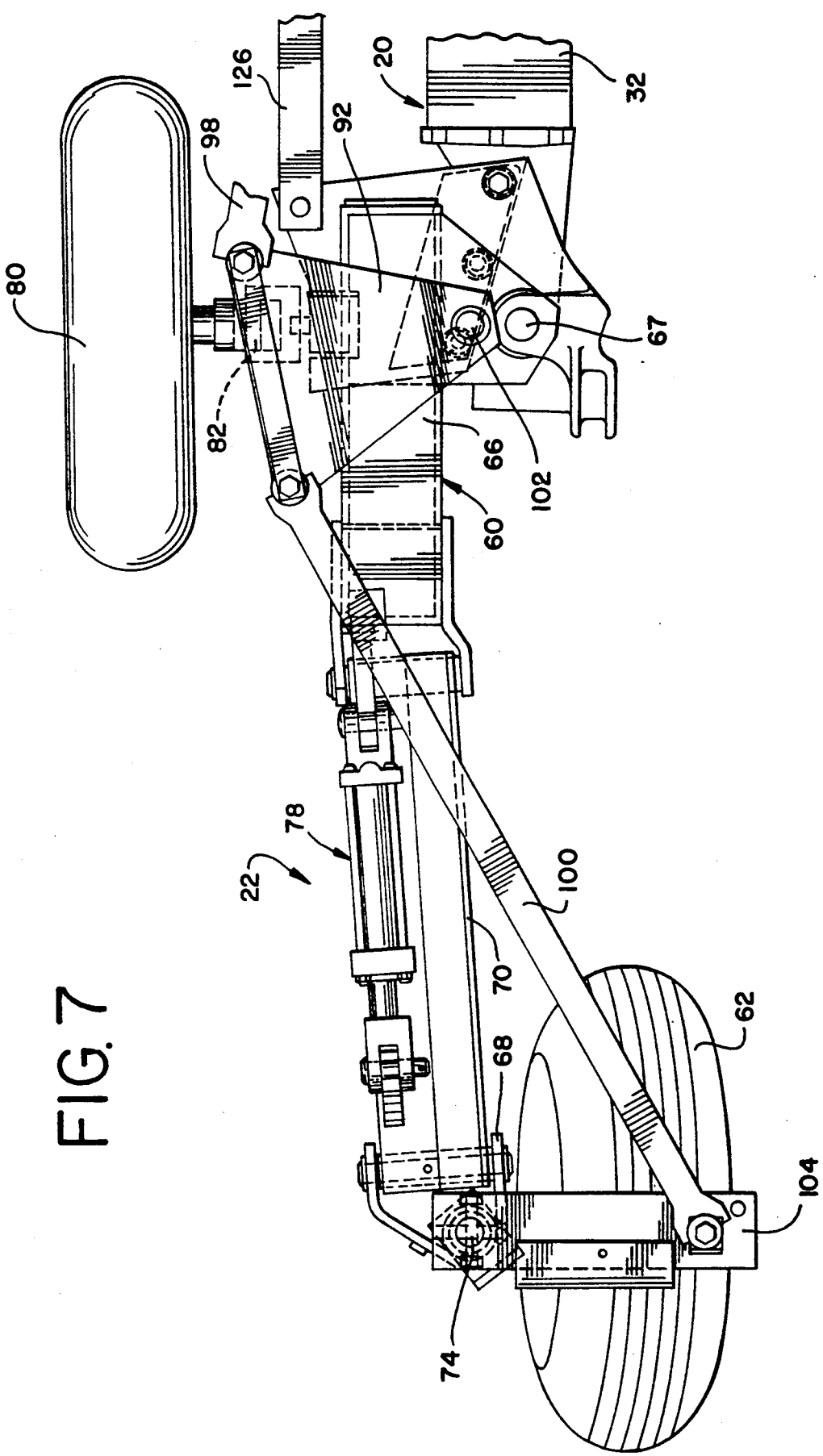

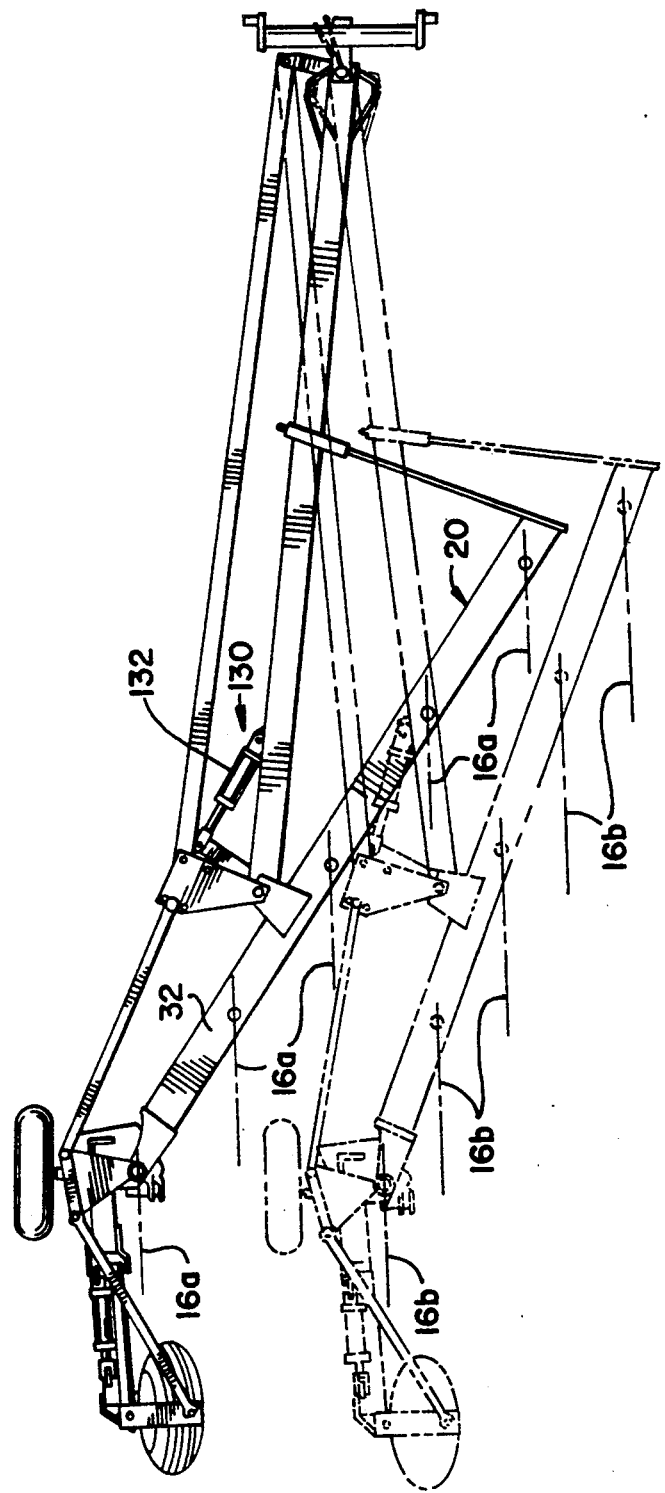

ON-LAND PLOW ASSEMBLY WITH A PLURALITY OF ADJUSTABLE PLOW UNITS

FIELD OF THE INVENTION

The present invention generally relates to farm implements and, more particularly, to an on-land plow assembly including a plurality of adjustable plow units mounted on a common frame and which are pulled across a field by a tractor for simultaneously plowing a plurality of furrows.

BACKGROUND OF THE INVENTION

Plow assemblies having a plurality of plow units mounted to a common or main frame which is pulled behind a tractor or other suitable agricultural implement are well known in the art. As is known, each plow unit is mounted at pre-selected intervals along the main frame which is inclined relative to the direction of travel of the tractor. As the plow assembly is pulled across the field, a trailing plow unit will turn plowed earth into a furrow formed by a preceding plow unit.

At a quick glance, all plow assemblies generally appear alike and serve equal functions. A typical plow assembly arranges the plow units behind and such that they are pulled across a field by the tractor. A typical plow assembly further includes a steering system including a ground engaging steering wheel conventionally arranged at a rear end of the plow assembly. During a plowing operation, the steering system maintains the steering wheel generally parallel to the tractor wheels. In response to turning of the tractor, the steering system angles the steering wheel thereby facilitating turning of the plow assembly with the tractor.

Notwithstanding the similarities, the agricultural industry has distinctively characterized plow assemblies into two types: "In-Furrow" and "On-Land" plow assemblies. An "In-Furrow" plow assembly is typically used with a small type tractor and has three to six plow units arranged in combination therewith. A rear wheel of the tractor is arranged to ride in a previously plowed furrow and, thus, the name "In-Furrow" plow assembly. During use, an "In-Furrow" plow assembly is generally restricted to turn approximately 30° to 35° to each side of the direction of travel of the tractor. If an "In-Furrow" plow assembly is forced to turn more than 30° to 35° to either side of the direction of travel of the tractor, the plow assembly will most likely be damaged. Such damage will result from a rear tractor wheel impacting with a portion of the plow assembly or the plow assembly falling over upon itself, thus, lending itself to damage. Such damage will not only necessitate downtime to repair, but also requires a replacement plow assembly to continue the plowing operation.

A "On-Land" plow assembly typically includes six or more plow units. The additional plow units require a larger size tractor to develop the necessary pulling power for such plow assemblies. As compared to an "In-Furrow" plow assembly, an "On-Land" plow assembly allows the tractor wheels to ride on-land adjacent a previously plowed furrow. The larger tractors sometimes use articulated steering and, thus, provide a shorter turn radius. The shorter turn radius of such larger tractors, requires the "On-Land" plow assemblies to be designed to turn approximately 60° to 75° to each side of the direction of the tractor.

From inventory and manufacturing cost perspectives, it is beneficial to duplicate as many parts as possible between the two different plow assemblies. The design and turning limitations (35°) of an "In-Furrow" plow assembly in each direction of tractor travel does not, however, lend itself to the tighter turning radius of larger tractors. An "In-Furrow" plow assembly may allow the steering wheel of the steering system to slide across the field when the turning limitation (35°) of the tractor is exceeded. The larger turning angle (60° to 75°) of a larger tractor, however, greatly exceeds the turning limitations of an "In-Furrow" plow assembly and would likely result in damage to an "In-Furrow" plow assembly if the two were used in combination with each other. As will be appreciated, an "In-Furrow" steering system will not properly function with an "On-Land" plow assembly because of the relatively large steering angle of the tractor during a turning motion. Thus, and although they appear similar, the "In-Furrow" and "On-Land" plow assemblies require separate and distinct parts which substantially increase inventory and manufacturing costs for the different plow assemblies.

Most conventional plow assemblies have the capability of changing spacing between adjacent plow units. Heretofore, adjusting the spacing between adjacent plow units has been a tenuous and time-consuming task. Thus, it would be advantageous to permit the spacing between adjacent plow units to be changed without requiring extensive operator involvement.

Thus, there is a need and desire for a plow assembly capable of successfully permitting a relatively large turning angle of a tractor relative thereto and wherein the plow units can be easily adjusted to vary the spacing therebetween preferably through a continuous range of spacings.

SUMMARY OF THE INVENTION

In view of the above, and in accordance with the present invention, there is provided a plow assembly adapted to be pulled behind an agricultural implement, such as a tractor, and includes a plurality of plow units, each of which is capable of producing a furrow. The plow assembly includes a main frame having a horizontal beam which is inclined relative to the direction of travel of the plow assembly and has the plow units connected thereto. The main frame is connected to the tractor about a generally vertical axis allowing the main frame to rotate through an angle in excess of 35° to opposite sides of the direction of movement of the tractor. A ground engaging steering wheel is provided at and supports a rear end of the main frame. A steering system holds the steering wheel generally parallel to the furrows produced by the plow units and turns the steering wheel through an angle in response and opposite to a steering angle of the tractor to bring the plow assembly around behind the tractor during turns. To compensate for large steering angles of the tractor, the steering system includes a linkage mechanism for proportionately reducing the turning angle of the steering wheel relative to the steering angle of the tractor thereby allowing the steering angle of the tractor to exceed 35° relative to the direction of travel of the plow assembly while facilitating turning of the plow assembly directly behind the tractor during turns.

The main frame of the plow assembly preferably has each plow unit individually connected thereto at equal lateral increments and for rotation about their respective axes. In a preferred form of the invention, the main frame further includes an elongated member connected at a forward end to the tractor about the generally vertical axis and is connected proximate midlength to the elongated beam of the main frame. Limit stops are provided for limiting angular movement of the main frame about the generally vertical axis and relative to the tractor.

To further support the plow assembly, a support mechanism including a ground engaging caster wheel is provided at a forward end of the main frame. The support structure for the front caster wheel and rear steering wheel are substantially similar. Each support structure preferably includes a power actuated mechanism for vertically moving the respective wheels relative to the main frame. A land wheel affixed to the main frame regulates the depth of the furrows produced by the plow units.

The steering system linkage mechanism or assembly includes a first rotatable arm responsive to the turning angle of the tractor and a second rotatable arm arranged toward a distal end of the main frame and connected to the steering wheel. In response to a tight turn of the tractor, the linkage mechanism proportions the relatively large motion of the first arm and moves the steering wheel an appropriate amount to effect turning of the plow assembly. The linkage mechanism proportionately reduces the turning angle of the steering wheel relative to the steering angle of the tractor thereby allowing the tractor to exceed a 35° turn relative to the direction of travel of the plow assembly while still facilitating turning of the plow assembly. In one form of the invention, the linkage mechanism has a series of pivotal connections whose axes establish first and second quadrilateral configurations and furthermore and preferably includes means for adjusting operation of the steering mechanism.

Another aspect of the present invention relates to the provision of an adjustment mechanism for simultaneously moving the plow units through a continuous range thereby modifying the spacing between adjacent furrows. In a preferred form of the invention, an elongated bar interconnects the plow units for simultaneous movement about their respective vertical axes and such that the furrows produced by the plow units remain generally parallel to each other. A control mechanism, operable from an operator's station on the tractor, is connected to the elongated bar for selectively moving all of the plow units about their respective vertical axes thereby altering the inclination of the horizontal beam of the main frame relative to the direction of travel and thereby modulating the distance separating the furrows while the plow assembly is pulled by the tractor.

Using substantially similar front and rear support structures minimizes inventory and manufacturing costs for the plow assembly. The steering problem normally associated with plow systems pulled by tractors which turn in excess of 35° relative to the direction of travel of the plow system, is addressed by the present invention through use of a linkage mechanism which proportionately reduces the turning angle of the steering wheel relative to the turning angle of the tractor thereby allowing the tractor to effect turns having a relatively tight steering radius while having the plow assembly follow behind the tractor without damage thereto. The steering system of the present invention furthermore automatically maintains the steering wheel parallel to the furrows produced by the plow units for all settings of the spacings between the plow units within the predetermined range. Moreover, the adjustability of the steering system provides that the motion imparted to as well as the responsiveness of the steering wheel may be modified to adapt the plow assembly to changes in operation.

As will be appreciated, simultaneous rotation of the plow units causes a change in the inclination of the horizontal beam relative to the direction of movement of the plow assembly thereby changing the spacing between adjacent furrows. The operator can save hours of work by adjusting the width between adjacent furrows. An advantage of the present invention being that such changes can be effected without extensive operator intervention and in an automatic manner thus avoiding the additional cost to the farmer for a new plow assembly.

Numerous other features and advantages of the present invention will become readily apparent from the following detailed description, the accompanying drawings, and the appended claims.

BRIEF DESCRIPTION OF THE DRAWINGS

FIG. 1 is a plan view of a plow assembly according to the present invention attached to a rear end of an agricultural implement such as a tractor;

FIG. 2 is a side elevational view of the plow assembly of FIG. 1;

FIG. 3 is an enlarged plan view illustrating a hitch assembly for connecting the plow assembly to the agricultural implement;

FIG. 6 is an enlarged side elevational view of support mechanism for the plow assembly of the present invention;

FIG. 7 is a plan view of the support mechanism shown in FIG. 6;

FIG. 11 is a schematic diagram illustrating adjustment of the plow assembly according to the present invention.

DETAILED DESCRIPTION OF THE PRESENT INVENTION

Figure 5:
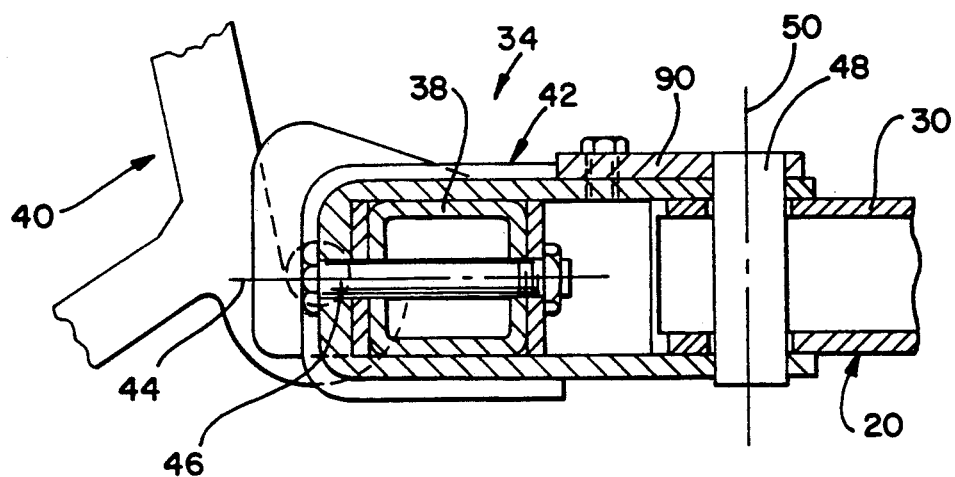
FIG. 5 is a sectional view taken along line 5—5 of FIG. 3.

While the present invention is susceptible of embodiment in various forms, there is shown in the drawings and will hereinafter be described, a preferred embodiment of the invention with the understanding that the present disclosure is to be considered as an exemplification of the invention which is not intended to limit the invention to the specific embodiment illustrated.

Turning now to the drawings, wherein like reference numerals refer to like parts throughout the several views, there is shown a plow assembly 10 adapted for connection to and pulled behind an agricultural implement such as tractor 12. The tractor 12 has tandum rear wheels 14 powered sufficiently to pull the plow assembly 10 across the field, and has a steering mechanism enabling the tractor to turn in either direction. It is conventional to provide such a tractor with articulated steering to enable the tractor to make relatively tight turns of a relatively short radius.

The plow assembly 10 includes a plurality of conventional plow units generally designated by reference numeral 16. Although five plow units are shown, it should be appreciated that a greater number of plow units can be used in conjunction with the plow assembly without detracting or departing from the spirit and scope of the present invention. Each plow unit includes a ground engaging element 18 such as a moldboard which is capable of producing a furrow when properly positioned and the plow assembly is pulled along by the agricultural implement. According to the present invention, a preferred form of plow assembly further includes a main frame 20, support assemblies 22 and 24 arranged at opposite ends of and supporting the main frame 20, and a mechanism 26 for steering the plow assembly relative to the tractor.

As shown in FIGS. 1 and 2, the main frame 20 includes an elongated member 30 extending generally in the direction of tractor travel and a horizontally elongated beam 32 which is inclined relative to the direction of travel of the plow assembly. In the illustrated embodiment, a forward end of member 30 is connected to the tractor 12 through a hitch assembly 34. A rear end of member 30 is fixedly connected proximate midlength of beam 32. A bracket 36 is used to connect and facilitate support of beam 32 to and from member 30. As will be described hereinafter, the plow units 16 are individually connected to and along the length of beam 32 at equally spaced intervals.

Figure 4:
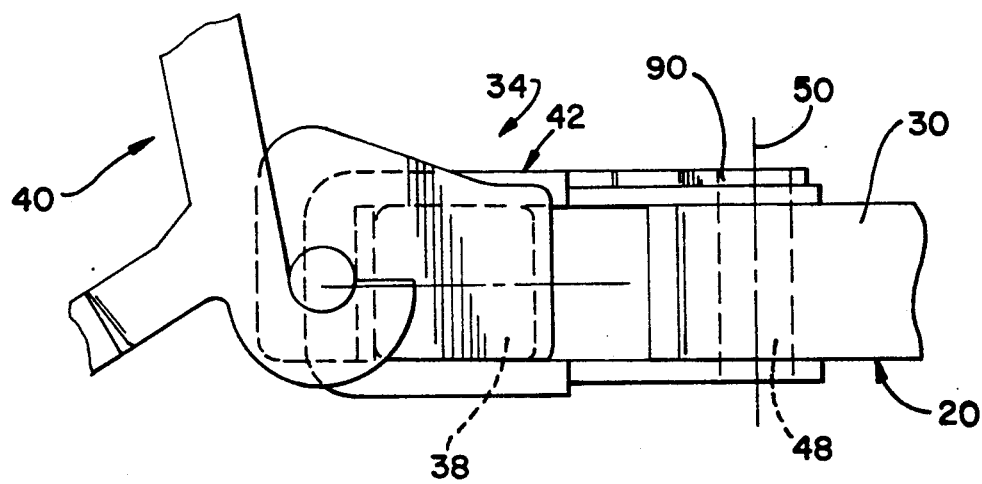
FIG. 4 is a side elevational view of the hitch assembly illustrated in FIG. 3.

Turning to FIGS. 3, 4, and 5, the hitch assembly 34 includes a horizontal generally rectangular bar 38 connected at opposite ends to a conventional hitch mechanism generally designated 40 provided at a rear end of the tractor such that when the tractor turns, the bar 38 turns through the same steering angle as the tractor. A coupling 42 is provided proximate midlength of the bar 38. As shown in FIGS. 3 and 5, the coupling 42 is affixed to the bar 34 such that the bar 38 can rotate about a fore-and-aft generally horizontal axis 44 defined by an elongated bolt 46. Thus, unequal vertical movement of the tractor wheels 14 will not impart a twisting motion to the main frame 20. Coupling 42 further includes a generally vertical shaft or spindle 48 which defines a generally vertical axis 50 about which the main frame is connected for rotation to the tractor.

As shown in FIGS. 1 and 3, the plow assembly of the present invention further includes limit stops 52 and 54 for limiting angular movement of the main frame 20 when connected to and relative to the tractor. As shown, the limit stops 52 and 54 extend outwardly from opposite sides of the elongated member 30 and define stopping surfaces 56 and 58, respectfully. In the illustrated embodiment, each stopping surface 56, 58 is adapted to abut against the hitch assembly 34 when the main frame has reached the limit of angular movement relative to the tractor. Notably, the limit stop 52 allows approximately 45 to 60 degrees of angular movement between the main frame and tractor in one direction of turning while limit stop 54 permits about 60 to 75 degrees of angular movement between the main frame and the tractor in an opposite direction of tractor turning movement.

Figure 8:
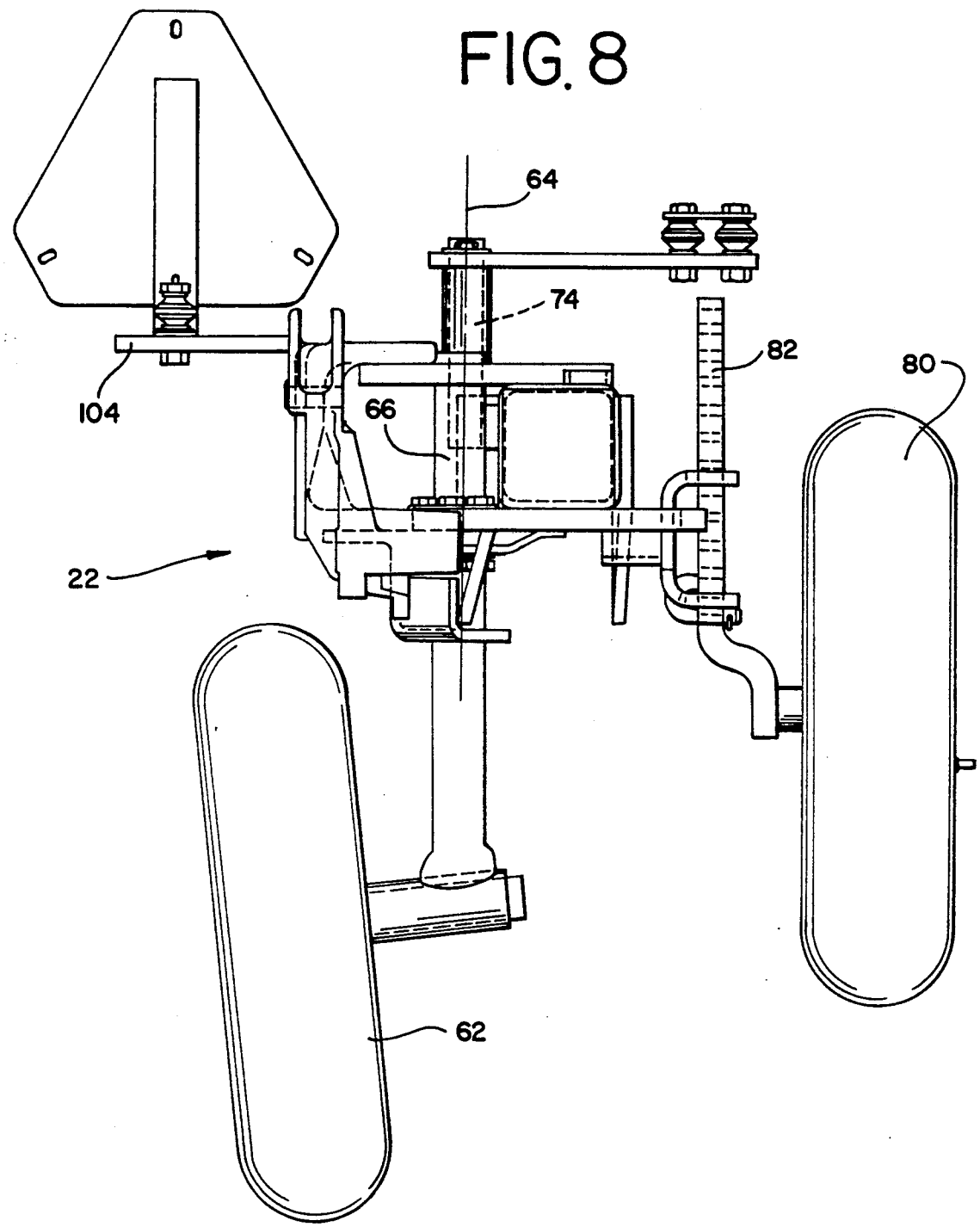
FIG. 8 is an end view of the support mechanism illustrated in FIG. 6.

The support assembly 22 is articulately connected to and supports a rear end of the main frame 20. Support assembly 22 includes a frame 60 which carries a steering wheel 62 for generally vertical movement relative to the main frame 20 and for angular movement about a generally vertical axis 64 (FIGS. 6 and 8). As will be described hereinafter, steering wheel 62 is located in a manner to always follow in the furrow formed by the rearmost plow unit 16 on the main frame 20 during plowing.

In the illustrated embodiment, frame 60 is configured as a parallelogram assembly including a forward frame member 66 and a rear frame member 68 which are joined by vertically spaced and parallel links 70 and 72 pivotally connected at opposite ends to members 66 and 68. The forward frame member 66 is pivotally connected at 67 (FIG. 7) to the elongated inclined beam 32 of main frame 20. As seen in FIG. 8, the rear frame member 66 is configured with a vertical sleeve which rotatably accommodates a vertical axle or support 74 for the steering wheel 62.

The support assembly 22 is further provided with a driver 78 for selectively and vertically moving the steering wheel 62 relative to the main frame 20 thereby influencing the position of the main frame 20 and the plow units carried thereby relative to a ground surface over which the plow assembly moves. Preferably, the tractor hitch mechanism 40 is vertically operated concurrently with driver 78 and in a conventional manner to maintain the plow assembly in a generally level condition. In the illustrated embodiment, the driver 78 includes power actuated means such as a hydraulic cylinder or motor having one end connected to the forward frame member 66 of frame 60 and an opposite end connected to link 72 of the parallelogram linkage assembly.

As shown in FIGS. 7 and 8, support assembly 22 further includes a land wheel 80. Land wheel 80 is carried on the support assembly 22 as by a vertically adjustable support 82 which regulates the vertical disposition of wheel 80 relative to the main frame 20. The land wheel 80 engages the ground surface during plowing and limits the working depth of the plow units and thereby the depth of the furrows.

Returning to FIGS. 1 and 2, the support assembly 24 at the forward end of the main frame 20 promotes relatively large turning angles (in excess of 35°) of the tractor relative to the direction of travel of the plow assembly by providing vertical support for the forward end of the main frame 20. In a preferred form, support assembly 24 includes a frame 84 which carries a free-turning caster wheel 86 for generally vertical movement relative to the main frame 20.

To reduce inventory and manufacturing costs for the plow assembly, frame 84 is substantially identical in construction to frame 60 of support assembly 22. That is, frame 84 is designed as a parallelogram assembly which is joined to the forward end of beam 32 of the main frame 20 and provides free turning support for the ground engaging caster wheel 86. In a manner similar to support assembly 22, support assembly 24 further includes a driver 88 for selectively moving the caster wheel 86 in a vertical direction relative to the main frame thereby influencing the vertical disposition of the main frame 20 and the plow units 16 connected thereto.

A salient feature of the present invention concerns the steering mechanism 26. The steering mechanism 26 normally holds the steering wheel 62 generally parallel to the furrows produced by the plow units as the plow assembly is moved across the field. To enhance the ability of the tractor to affect relatively large angle turns relative to the direction of travel of the plow assembly, the steering mechanism 26 has been designed to reduce the turning angle of the steering wheel 62 relative to the steering angle of the tractor thereby allowing the steering angle of the tractor to exceed 35° relative to the direction of travel of the plow assembly while facilitating turning of the plow assembly behind the tractor as the tractor turns at the end of a plowing operation.

In a preferred form, the steering mechanism 26 includes a linkage mechanism or assembly comprised of a first driver 90, a second driver 92, and mechanism 94 connected to and between the first and second drivers 90 and 92, respectively, for proportionately reducing the motion imparted therebetween. In a most preferred form of the invention, a first tie rod 96 connects driver 90 to mechanism 94, and a second tie rod 98 connects the mechanism 94 to driver 92. Driver 92 is connected as by a third tie rod 100 to the steering wheel 62 to control the angular disposition of the wheel.

Driver 90 is preferably configured as a rotatable arm that responds to the turning angle of the tractor. As shown in FIGS. 3, 4, and 5, driver 90 is affixed to and for rotation with coupling 42 and is rotatable about the generally vertical axis 50 defined by spindle 48". A forward end of tie rod 96 is articulately connected to the driver 90. The distance separating the vertical axis 50 of shaft 48 from the point of connection of driver 90 to tie rod 96 measures the "effective length" of driver 90. Notably, driver 90 moves through an angle corresponding in magnitude to the turning angle of the tractor.

Driver 92 is preferably configured as an arm that is rotatably mounted to the support assembly 22. As shown in FIGS. 6 and 7, an upright shaft 102, arranged in laterally spaced relation to pivot 67, rotatably mounts the driver arm 92 to the forward frame 66 of support assembly 22. In the embodiment illustrated, the lateral offset relation between shaft 102 and pivot 67 allows sufficient clearance of arm 92 relative to vertical displacement of trip linkage mechanisms (not shown) associated with the plow units. Preferably, shaft 102 and pivot 67 would be axially aligned. A rear end of tie rod 98 articulately connects driver 92 to the mechanism 94. The distance separating the upright axis of shaft 102 from the point of connection of driver 92 to tie rod 98 measures the "effective length" of driver 92. The third tie rod 100 extends from driver 92 and is connected to an outboard end of a link or arm 104. Link 104 is secured toward an upper end of the vertical axle 74 adapted to turn or steer the steering wheel 62.

Figure 9:
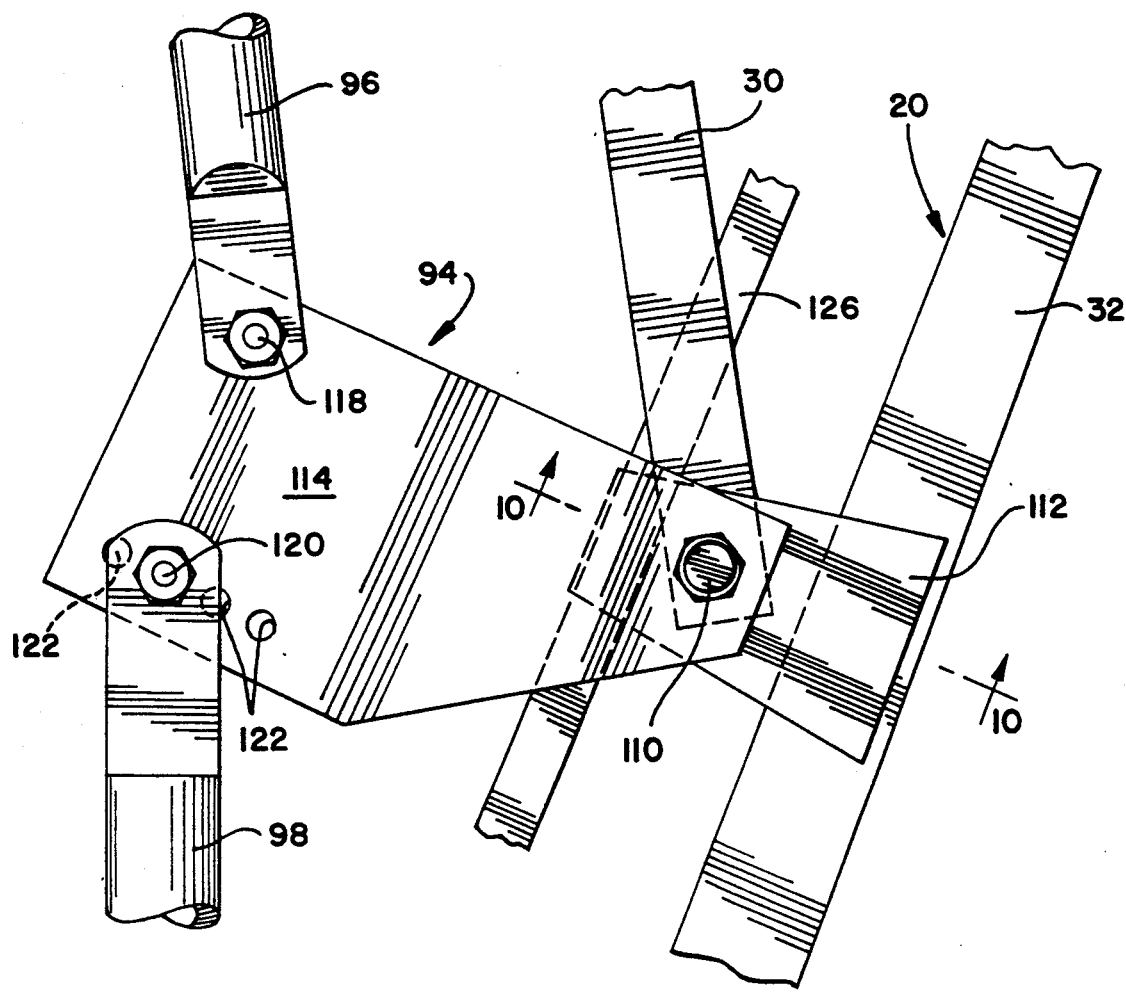
FIG. 9 is an enlarged plan view of a lost motion mechanism of the present invention.
Figure 10:
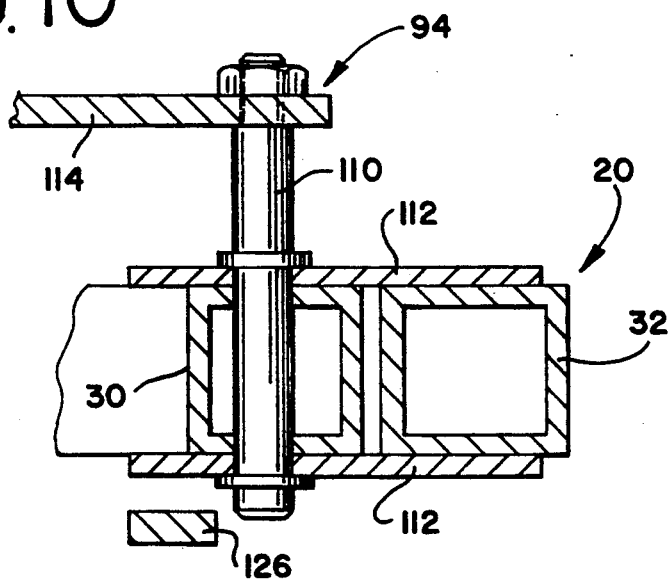
FIG. 10 is a sectional view taken along line 7—7 of FIG. 6.

As mentioned, the main frame 20 has elongated member 30 connected proximate midlength and to the elongated beam 32. In a most preferred form of the invention, member 30 is welded or otherwise fixedly secured to beam 32. Turning now to FIGS. 9 and 10 and to promote simplicity for the invention, mechanism 94 is preferably provided at the connection between member 30 and beam 32. As shown, a vertical shaft 110 rotatably passes through cantilevered brackets 112 which embrace member 30 and are affixed to beam 32. A cantilevered steering member 114 is rigidly attached to the top of shaft 110 for rotation about the longitudinal axis thereof. As will be appreciated, a first quadrilateral formation is established by the pivotal axes of the connections between the rod 96 with steering member 114 and arm 90, arm 90 with elongated member 30 of the main frame 20, and the vertical shaft 110 pivotally connecting steering member 114 to beam 32.

At its free end, the steering member 114 has the first tie rod 96 connected thereto as at 118. The free end of the steering member 114 is configured so as to allow the second tie rod 98 to likewise be connected as at 120. As will be appreciated, the location of connections 118 and 120 relative to the shaft 110 measure the "effective length" of the steering member 114. As will be appreciated, a second quadrilateral formation is established by the pivotal axes of the connections between the rod 98 with steering member 114 and arm 92, arm 92 with beam 32, and the vertical shaft 110 pivotally connecting steering member 114 to beam 32. In the illustrated embodiment, the effective length of steering member 114 is greater than the effective length of either the first or second arms 90 or 92, respectively.

To add adjustability to mechanism 94, steering member 114 is preferably provided with a series of apertures 122 which facilitate connection of tie rod 98 at different radial distances from the pivotal axis of the steering member 114. The different connection points on the steering member 114 permit modification of the effective length of the rotatable steering member 114 and thus configuring at least one of the quadrilateral formations into a non-parallelogram configuration thereby allowing the motion imparted between arms 90 and 92 to be proportionately reduced. Moreover, the adjustability added by aperture 122 allows the magnitude of turning movement imparted to the steering wheel 62 in response to the tractor turning can be modified within a predetermined range. Although the series of apertures 122 are shown associated with the steering member 114 and the rod 98, it will be apparent to those skilled in the art that the adjustability of the linkage 26 can be otherwise provided otherwise without departing from the spirit and scope of the present invention.

Another salient feature of the present invention concerns adjusting the plow units 16 through a predetermined range of motion thereby modifying the spacing between adjacent furrows as a function independent of the steering motion imparted to steering wheel 62 as through steering mechanism 26. The plow units 16 are attached to the inclined beam 32 in equally spaced relation to each other. Preferably, each plow unit 16 is individually attached to the elongated beam 32 for rotation about a generally vertical axis.

To facilitate adjustment, and as shown in FIG. 1, each plow unit 16 further includes an attachment mechanism permitting attachment of the plow unit to beam 32 and including a flange 124 which horizontally extends to one side of the inclined beam 32. A free end of each flange 124 is articulately connected to an elongated bar 126 which extends generally parallel to beam 32. As illustrated in FIG. 7, bar 126 is likewise connected to frame member 66 of rear support assembly at a point radially spaced from pivot 67. To facilitate adjustment of the plow units, bar 126 is movable generally parallel to the beam 32 under the influence of a driver assembly 130. The driver assembly includes power actuated means 132 in the form of a hydraulic cylinder having one end connected to member 30 and an opposite end connected through conventional linkage 133 to bar 126.

When the plow units 16 are adjusted proximate their midrange of angular travel, the axes of rotation of each plow unit and the pivotal connection of the flange 124 with bar 126 both lie along a line extending generally perpendicular to the axis of the guide bar 126. This arrangement has the advantage that enhances the leverage or mechanical advantage exerted on the plow units by the driver assembly 130 and is useful not only in angularly adjusting the plow units, but also in maintaining the plow units 16 in desired lateral spacing relative to each other.

During operation, and as the plow assembly is pulled behind the tractor, the support assemblies 22 and 24 support the main frame 20 and generally control the disposition of the plow units 16 relative to the ground surface as a function of fluid flow to drivers 78 and 88. As will be appreciated, operation of the hitch mechanism 40 promotes levelness of the main frame 20 during operation. The land wheel 80 will substantially control the depth of the furrows. In a preferred form of the invention, the steering wheel 62 will ride in the furrow formed by the rearmost plow unit. The steering mechanism 26 maintains the steering wheel 62 generally parallel to the wheels on the tractor as the power assembly is pulled along a relatively straight line path.

When the tractor is turned relative to the direction of travel of the plow assembly, the steering mechanism 26 will turn the steering wheel 62 through an angle which is opposite to the steering angle of the tractor to thereby swing the plow assembly behind the tractor. One advantage of the present invention is that the steering mechanism 26 allows the tractor to be turned through a tight turn radius, i.e., the tractor can be turned through a steering angle in excess of 35° relative to the direction of travel of the plow assembly. In this regard, the forward support assembly 24 promotes support of the forward end of the main frame 20 thereby allowing such tight turns.

Notably, driver 90 of steering mechanism 26 turns through a corresponding angle to that of the steering angle of the tractor. Normally during tight turns (in excess of 35° relative to the direction of travel of the plow assembly), movement imparted by driver 90 will be in excess of that required to move the steering wheel 62. Mechanism 94, however, acts as a lost motion device and advantageously proportions the movement of the driver 90 and steers wheel 62 through an angle which is reduced relative to the steering angle of the tractor. Accordingly, the tractor can effect relatively tight turns with the plow assembly turned therebehind. Stops 52 and 54 limit the angular movement of the plow assembly relative to the tractor.

Mechanism 94 of the steering mechanism further allows customization of the steering mechanism to the particular plowing operation being performed. As will be appreciated, the effective lengths of arms 90, 92, and 114 relative to each other will regulate the steering angle of the wheel 62 relative to the turning angle of the tractor and thereby regulate turning action of the plow assembly relative to the tractor. The ability to vary the effective length of steering member 114 of mechanism 94 will, of course, allow operation of the steering mechanism to be modified to suit a particular plowing operation.

Still another advantage of the present invention is the ability to adjust spacing between adjacent furrows as the plow assembly is being pulled behind the tractor. The cylinder 132 of driver assembly 130 is preferably a double-acting cylinder which allows positive translation of the bar 126 in opposite directions thereby forcibly rotating the plow units 16 about their respective vertical axes in either angular direction. As will be appreciated, retraction of the cylinder 132 "closes" the plow units relative to each other such that the lateral spacing between adjacent furrows becomes closer while extension of the cylinder 132 "opens" the plow units 16 relative to each other thereby resulting in an increase in the spacing between adjacent furrows produced by the plow units.

In FIG. 11, some structural representations have been omitted for purposes of clarity, while lines 16a represent the cutting lines of plow units arranged on the elongated beam 32 of the main frame 20 shown in solid lines. As will be appreciated, mounting the plow units for rotation about individual axes tends to straighten the respective plow unit as it is pulled through the ground in a manner similar to a rudder acting on a ship. When a change in spacing between furrows is desired, the drive assembly 130 is operated.

When it is desired to lessen the spacing between adjacent furrows, the cylinder 132 of driver assembly 130 is retracted thereby altering the cut lines provided by the plow units and thereby shifting the inclination of the elongated beam to the position illustrated in dotted lines in FIG. 11. As will be appreciated, a change in the inclination of the beam 32 modifies or alters the spacing between adjacent furrows while maintaining the spacing of the plow units relative to the beam. When the appropriate spacing is achieved, the drive assembly 132 holds the beam 32 in the desired position while all of the plow units tend to self straighten. After the plow units straighten out relative to each other, the lateral spacing between adjacent units is modified as shown by cut lines 16b in FIG. 11. Advantageously, the lateral spacing between adjacent plow units remains constant thereby achieving continuity in the furrow spacing.

As schematically illustrated in FIG. 7, one end of the elongated bar 126 is secured to the forward frame member 66 of the rear support assembly 22. When the drive assembly 130 is activated, movement of the bar 126 will cause rotation of the frame member 66 of support assembly 22 about the pivot shaft 67. Accordingly, upon shifting of the plow units, the steering wheel 62 is shifted therewith and will always ride in the furrow formed by the rearmost plow unit. Notably, however, the action of the drive assembly 130 on the steering wheel 62 is independent of that provided by the steering mechanism 26 relative to the steering wheel 62.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A plow assembly adapted for connection to a tractor having a pair of rear wheels which remain on-land during a plowing operation, said plow assembly including a plurality of row units each of which is provided with a ground engaging element for producing a furrow when the plow assembly is pulled along by the tractor, said plow assembly comprising:

a main frame including a generally horizontal elongated beam inclined relative to the direction of travel of the plow assembly and having the plow units individually connected thereto in spaced relation to each other along the length of said beam and for rotation about respective vertical axes, said main frame being connected to said tractor for rotation about a generally vertical axis;

front support means for supporting a forward end of said main frame, said front support means including a ground engaging caster wheel;

rear support means for supporting a rear end of said main frame, said rear support means including a steering wheel which is normally maintained generally parallel to the rear wheels of the tractor during a plowing operation;

an elongated bar extending generally parallel to the elongated beam of the main frame for interconnecting the plow units to each other for simultaneous movement about their respective vertical axes and such that cut lines produced by the ground engaging elements of the plow units remain generally parallel relative to each other;

control means operable from an operator's station on the tractor and connected to said elongated bar for selectively moving all of the plow units about their respective vertical axes to influence the inclination of said horizontal beam relative to the direction of travel of the plow assembly thereby varying the distance separating the cut lines between adjacent plow units; and operative means arranged independent of said control means for maintaining said steering wheel generally parallel to the rear wheels of the tractor and for turning said steering wheel through an angle in response to and in a direction opposed to a turning angle of the tractor, said operative means including first drive means radially extending from said generally vertical axis and rotatable in response to a turning movement of said tractor, second drive means connected toward a rear end of said main frame for turning said steering wheel, a linkage mechanism arranged in a non-parallelogram configuration and including a rotatable steering member arranged and connected between said first and second drive means for proportionately reducing the motion imparted between said first and second drive means and thereby proportionately reducing the turning angle of the steering wheel relative to the turning angle of the tractor to inhibit damage to the plow assembly, and wherein said linkage mechanism includes means for modifying the effective length of said rotatable steering member such that the magnitude of turning movement imparted to the steering wheel in response to the tractor turning can be modified within a predetermined range.

2. The plow assembly according to claim 1 including an elongated member connected at a forward end to said tractor for rotation about said generally vertical axis and connected at a rear end proximate midlength of said elongated beam of the main frame.

3. The plow assembly according to claim 2 further including means for limiting angular movement of said main frame relative to said tractor, said limiting means including limit stops extending outwardly from opposite sides of said elongated member.

4. The plow assembly according to claim 2 wherein the steering member of said operative means is rotatable about a connection between the rear end of said elongated member and the elongated beam of said main frame.

5. The plow assembly according to claim 1 wherein said front and rear support means each include substantially identical frame assemblies extending from opposite ends of said main frame, each of said frame assemblies including means for selectively allowing generally vertical movement of the respective wheel attached thereto relative to the main frame.

6. The plow assembly according to claim 1 wherein said steering member has an effective length different from the effective length of said first drive means, and wherein said steering member and said first drive means are interconnected through linkage having a length different than the length of said elongated beam.

7. The plow assembly according to claim 1 wherein said operative means further includes driven means for turning said steering wheel and connected to said second drive means.

8. A plow assembly adapted to be pulled behind an agricultural implement and including a plurality of plow units each having ground engaging means capable of producing a furrow when the plow assembly is pulled along by the agricultural implement, said plow assembly comprising:

a main frame including a generally horizontal beam inclined relative to the direction of travel of the plow assembly and having each plow unit connected thereto in spaced relation relative to each other for rotation about respective vertical axes, said main frame further including an elongated structural member connected at one end in fixed relation to said horizontal beam and connected at an opposite end to said tractor about a generally vertical spindle defining an upright pivotal axis;

actuation means for simultaneously rotating all of the plow units about their respective vertical axes thereby adjusting the spacing between adjacent plow units within a predetermined range;

support means for supporting a rear end of said main frame, said support means including a ground engaging steering wheel adapted to ride in a furrow provided by the rearmost plow unit; and operative means for automatically holding said steering wheel generally parallel to the furrows produced by said plow units for all settings of the spacing between said plow units within said predetermined range and for turning said steering wheel through an angle in response to and in a direction opposed to a steering angle of the implement thereby facilitating turning of the plow assembly behind the agricultural implement, said operative means including a rotatable drive arm connected to said vertical spindle and responsive to the turning angle of the agricultural implement, a driven arm carried toward a distal end of said horizontal beam for pivotal rotation about a fixed vertical axis and connected to said steering wheel, a force transfer member pivotally connected to said horizontal beam for rotation about a vertical mount arranged intermediate said drive and driven arms, a first tie rod having a first end pivotally connected to a distal end of said force transfer member at a predetermined distance from said vertical mount and a second end pivotally connected to said drive arm such that a first quadrilateral is established by the axes of the pivotal connections between the first tie rod and said force transfer member and said drive arm, the pivotal axis of the drive arm relative to the main frame, and the pivotal axis of the force transfer vertical mount; said operative means further including a second tie rod having a first end pivotally connected to a distal end of said force transfer member at a second predetermined distance from the force transfer vertical mount and a second end pivotally connected to said driven arm such that a second quadrilateral is established by the axes of the pivotal connection between the second tie rod with said force transfer member and the driven arm, the pivotal axis of the driven arm relative to the main frame, and the pivotal axis of the force transfer vertical mount; and wherein one of the quadrilateral formations has a non-parallelogram configuration to proportionately reduce the turning angle of the steering wheel relative to the steering angle of the implement.

9. The plow assembly according to claim 8 wherein said actuation means includes an elongated bar extending generally parallel to said horizontal beam and interconnecting the plow units for simultaneous movement about their respective vertical axes such that the furrows produced by the ground engaging means of the plow units remain generally parallel to each other.

10. The plow assembly according to claim 9 wherein said actuation means further includes control means operable from an operator's position on the agricultural implement for selectively moving all of the plow units about their respective vertical axes to alter the inclination of the horizontal beam relative to the direction of travel of the implement and thereby modulate the distance separating the furrows while the plow assembly is pulled by the implement.

11. The plow assembly according to claim 10 wherein said control means comprises power actuated means for selectively shifting the elongated bar generally parallel to the horizontal beam to selectively move the plow units.

12. The plow assembly according to claim 8 with said support means including a frame extending rearwardly from a rear end of said main frame, said frame including means for selectively allowing generally vertical movement of said steering wheel relative to said main frame thereby influencing the position of said plow units relative to a ground surface.

13. The plow assembly according to claim 12 further including a land wheel affixed to said main frame for regulating the depth of the furrows produced by said plow units.

14. The plow assembly according to claim 8 wherein said driven arm is connected by a third tie rod to the steering wheel of said support means.

15. The plow assembly according to claim 8 further including means for limiting movement of the main frame relative to the agricultural implement.

* * * * *